United States Patent
Tai et al.

(10) Patent No.: US 10,400,782 B2
(45) Date of Patent: Sep. 3, 2019

(54) COMPRESSOR WHEEL AND FLUID COMPRESSION DEVICE COMPRISING THE SAME

(71) Applicant: NOPORVIS CO., LTD., Kaohsiung (TW)

(72) Inventors: Yuan-Hung Tai, Kaohsiung (TW); Hui-Hung Lin, Tainan (TW); Chun-Neng Chan, Kaohsiung (TW)

(73) Assignee: NOPORVIS CO., LTD., Kaohsiung (TW)

( * ) Notice: Subject to any disclaimer, the term of this patent is extended or adjusted under 35 U.S.C. 154(b) by 183 days.

(21) Appl. No.: 15/663,826

(22) Filed: Jul. 31, 2017

(65) Prior Publication Data
US 2019/0003483 A1 Jan. 3, 2019

(30) Foreign Application Priority Data
Jun. 28, 2017 (TW) .............................. 106121652 A

(51) Int. Cl.
| | |
|---|---|
| *F04D 29/28* | (2006.01) |
| *F04D 25/04* | (2006.01) |
| *F02C 3/08* | (2006.01) |
| *F04D 29/62* | (2006.01) |
| *F04D 17/02* | (2006.01) |
| *F04D 25/16* | (2006.01) |
| *F02B 33/40* | (2006.01) |

(52) U.S. Cl.
CPC ............ *F04D 29/286* (2013.01); *F02C 3/085* (2013.01); *F04D 17/025* (2013.01); *F04D 25/045* (2013.01); *F04D 25/16* (2013.01); *F04D 29/285* (2013.01); *F04D 29/624* (2013.01); *F02B 33/40* (2013.01); *F05D 2220/40* (2013.01)

(58) Field of Classification Search
CPC .... F04D 29/286; F04D 25/045; F04D 29/624; F04D 29/225; F04D 29/2255; F04D 29/281; F04D 29/284; F04D 29/30; F04D 29/4206; F04D 17/12; F04D 17/122; F02C 3/085; F02B 33/40; F05D 2220/40
USPC ......................................................... 416/179
See application file for complete search history.

(56) References Cited

FOREIGN PATENT DOCUMENTS

| | | | |
|---|---|---|---|
| CN | 201757065 U | | 3/2011 |
| CN | 103527512 A | | 1/2014 |
| CN | 204099271 U | * | 1/2015 |
| CN | 204099271 U | | 1/2015 |

* cited by examiner

*Primary Examiner* — Joseph J Dallo
*Assistant Examiner* — Scott A Reinbold
(74) *Attorney, Agent, or Firm* — Winston Hsu

(57) ABSTRACT

A compressor wheel of a fluid compression device includes a wheel part, a shaft part and a plurality of connection parts. The wheel part includes a main body formed with a through hole, and a plurality of blades protruded from an outer side of the main body. The shaft part is accommodated in the through hole and configured to connect to a rotor shaft. The plurality of connection parts is connected between an inner side of the main body and the shaft part. Wherein, a fluid passage is formed between the inner side of the main body and the shaft part to allow fluid to flow to a rear side of the compressor wheel from a front side of the compressor wheel via the fluid passage.

9 Claims, 4 Drawing Sheets

COMPRESSOR WHEEL AND FLUID COMPRESSION DEVICE COMPRISING THE SAME

BACKGROUND OF THE INVENTION

1. Field of the Invention

The present invention relates to a compressor wheel of a fluid compression device, and more particularly, to a compressor wheel of a fluid compression device capable of improving compression efficiency.

2. Description of the Prior Art

Generally, a turbo charger utilizes gas discharged from an internal combustion engine to drive a turbine rotor of the turbo charger to rotate, and the turbine rotor further boosts pressure of air in an intake passage of the internal combustion engine, so as to improve efficiency of the internal combustion engine. The turbine rotor of the turbo charger mainly comprises a turbine wheel, a compressor wheel and a rotor shaft connected to the turbine wheel and the compressor wheel. The turbine wheel is configured to be driven to rotate by air in an exhaust passage of the internal combustion engine, in order to further drive the compressor wheel to rotate. The compressor wheel further compresses the air in the intake passage of the internal combustion engine for improving efficiency of the internal combustion engine. In order to increase compression efficiency, blades of the compressor wheel are designed to increase air flow rate. However, the air flow rate of a single compressor wheel is limited. Therefore, how to increase flow rate of compressed air of the turbo charger is an important issue in the related industry.

SUMMARY OF THE INVENTION

The present invention provides a compressor wheel of a fluid compression device. The compressor wheel comprises a wheel part, a shaft part and a plurality of connection parts. The wheel part comprises a main body formed with a through hole, and a plurality of blades protruded from an outer side of the main body. The shaft part is accommodated in the through hole. The shaft part is configured to connect to a rotor shaft. The plurality of connection parts connected between an inner side of the main body and the shaft part. Wherein, a fluid passage is formed between the inner side of the main body and the shaft part to allow fluid to flow to a rear side of the compressor wheel from a front side of the compressor wheel via the fluid passage.

The present invention further provides a fluid compression device comprising a housing, a first compressor wheel, a second compressor wheel and a rotor shaft. The housing has a first accommodation space, a second accommodation space, a first passage arranged at one side of the first accommodation space and communicated with the first accommodation space, and a second passage arranged at one side of the second accommodation space and communicated with the second accommodation space. The first compressor wheel is arranged in the first accommodation space. The first compressor wheel comprises a wheel part, a shaft part and a plurality of connection parts. The wheel part comprises a main body formed with a through hole, and a plurality of first blades protruded from an outer side of the main body for guiding fluid in the first accommodation space to the first passage. The shaft part is accommodated in the through hole. The plurality of connection parts is connected between an inner side of the main body and the shaft part. Wherein, a fluid passage is formed between an inner side of the main body and the shaft part to allow the fluid to flow to the second accommodation space from the first accommodation space via the fluid passage. The second compressor wheel is arranged in the second accommodation space. The second compressor wheel has a plurality of second blades and is configured to guide fluid in the second accommodation space to the second passage. The rotor shaft is connected to the shaft part of the first compressor wheel and the second compressor wheel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
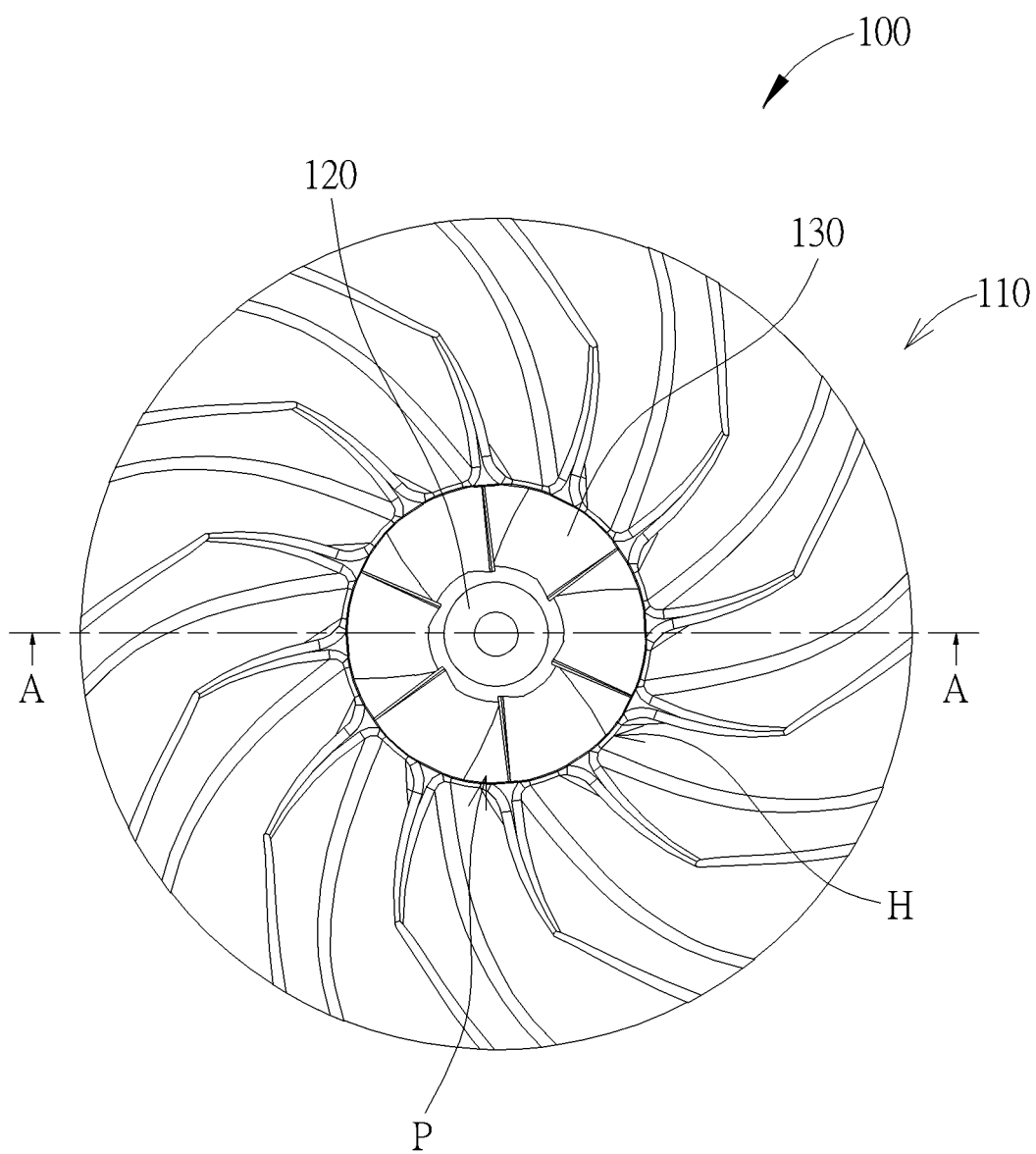
FIG. 1 is a top view of a compressor wheel of the present invention.
Figure 2:
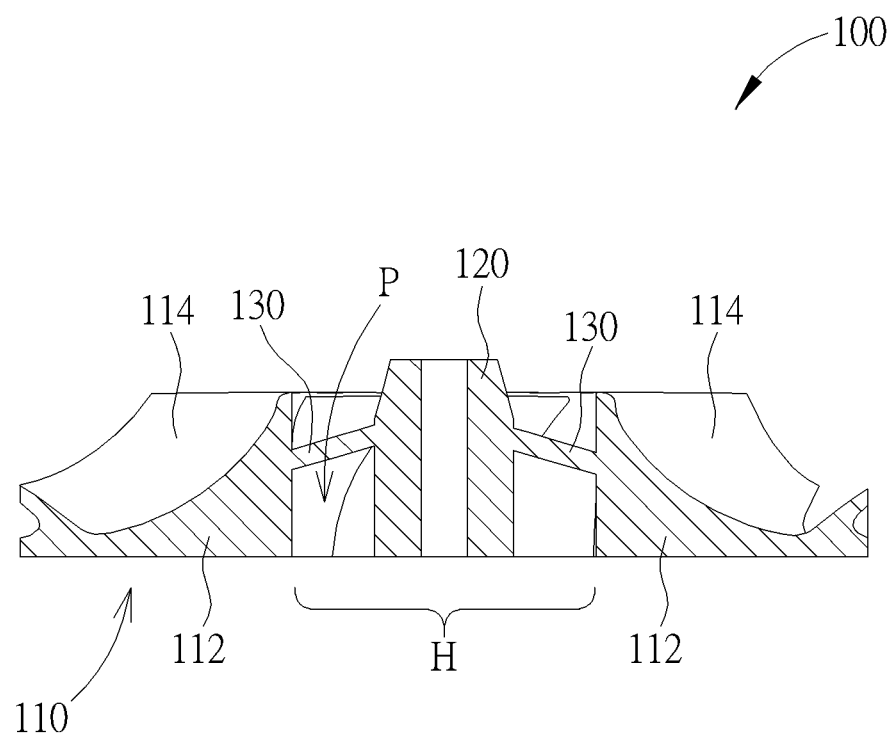
FIG. 2 is a cross-sectional view of the compressor wheel along line A-A of FIG. 1.
Figure 3:
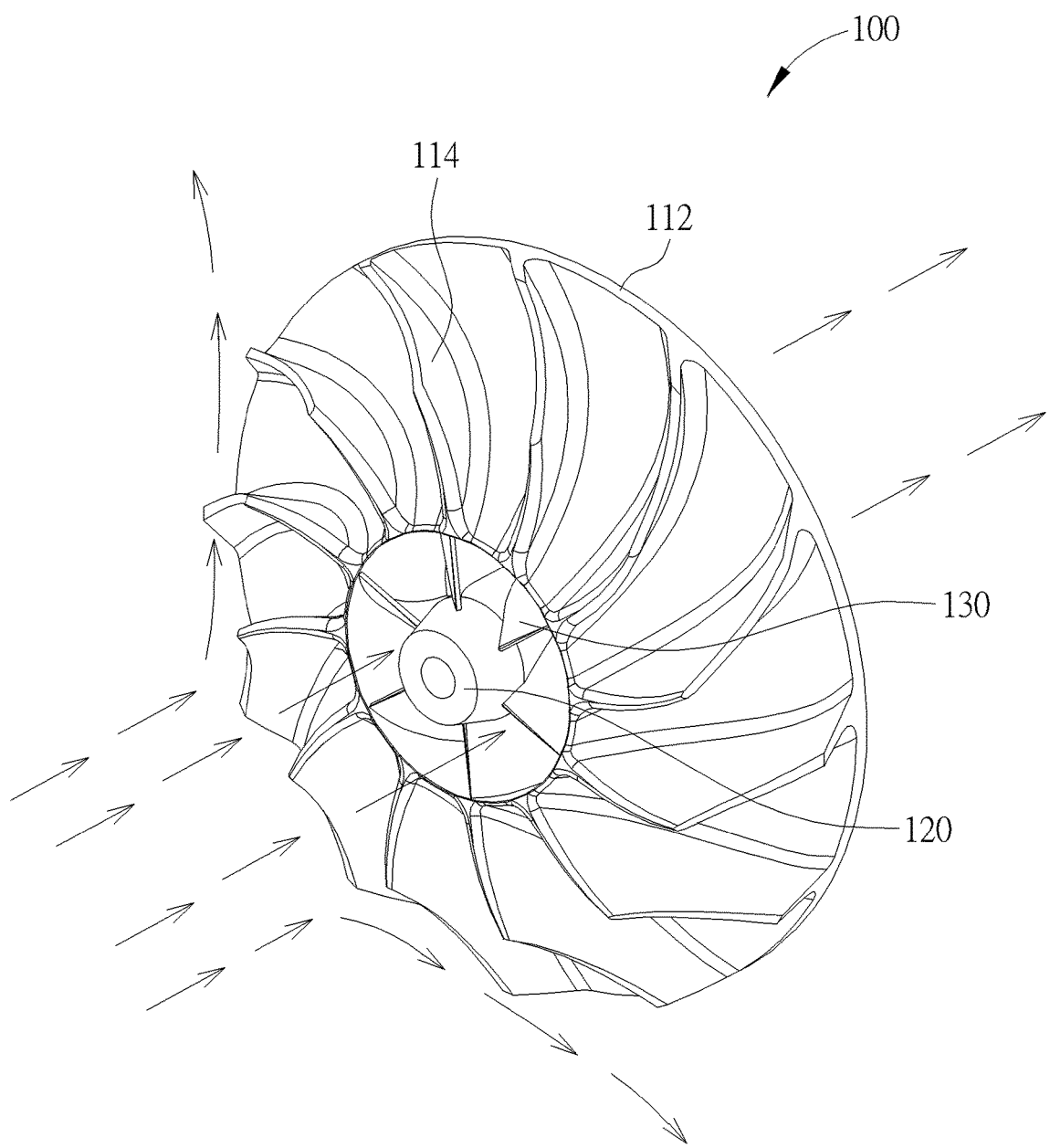
FIG. 3 is a diagram showing the compressor wheel of the present invention in another angle.

Please refer to FIG. 1 to FIG. 3. FIG. 1 is a top view of a compressor wheel of the present invention. FIG. 2 is a cross-sectional view of the compressor wheel along line A-A of FIG. 1. FIG. 3 is a diagram showing the compressor wheel of the present invention in another angle. As shown in figures, the compressor wheel 100 of the present invention comprises a wheel part 110, a shaft part 120 and a plurality of connection parts 130. The wheel part 110 comprises a main body 112 and a plurality of blades 114. The main body 112 is formed with a through hole H. The plurality of blades 114 is protruded from an outer side of the main body 112. The plurality of blades 114 is configured to guide fluid to a lateral side of the compressor wheel 100 from a front side of the compressor wheel 100 when the compressor wheel 100 rotates. The shaft part 120 is accommodated in the through hole H, and a rotation axis of the wheel part 110 is identical to a rotation axis of the shaft part 120. The plurality of connection parts 130 is connected between an inner side of the main body 112 and the shaft part 120. Since the wheel part 110 and the shaft part 120 are spaced from each other, a fluid passage P is formed between the inner side of the main body 112 and the shaft part 120. The fluid passage P is communicated with a front side of the compressor wheel 100 and a rear side of the compressor wheel 100 in order to allow the fluid to flow to the rear side of the compressor wheel 100 from the front side of the compressor wheel 100 via the fluid passage P.

On the other hand, in the present embodiment, each of the connection parts 130 of the compressor wheel 100 can be blade-shaped (such as spirally extended from the shaft part 120 to the inner side of the main body 112) and configured to guide the fluid to the rear side of the compressor wheel 100 from the front side of the compressor wheel 100 via the fluid passage P when the compressor wheel 100 rotates, in order to further increase flow rate of the fluid flowing to the rear side of the compressor wheel 100 from the front side of the compressor wheel 100 via the fluid passage P. Moreover, the plurality of connection parts 130 is radially arranged between the inner side of the main body 112 and the shaft part 120.

Figure 4:
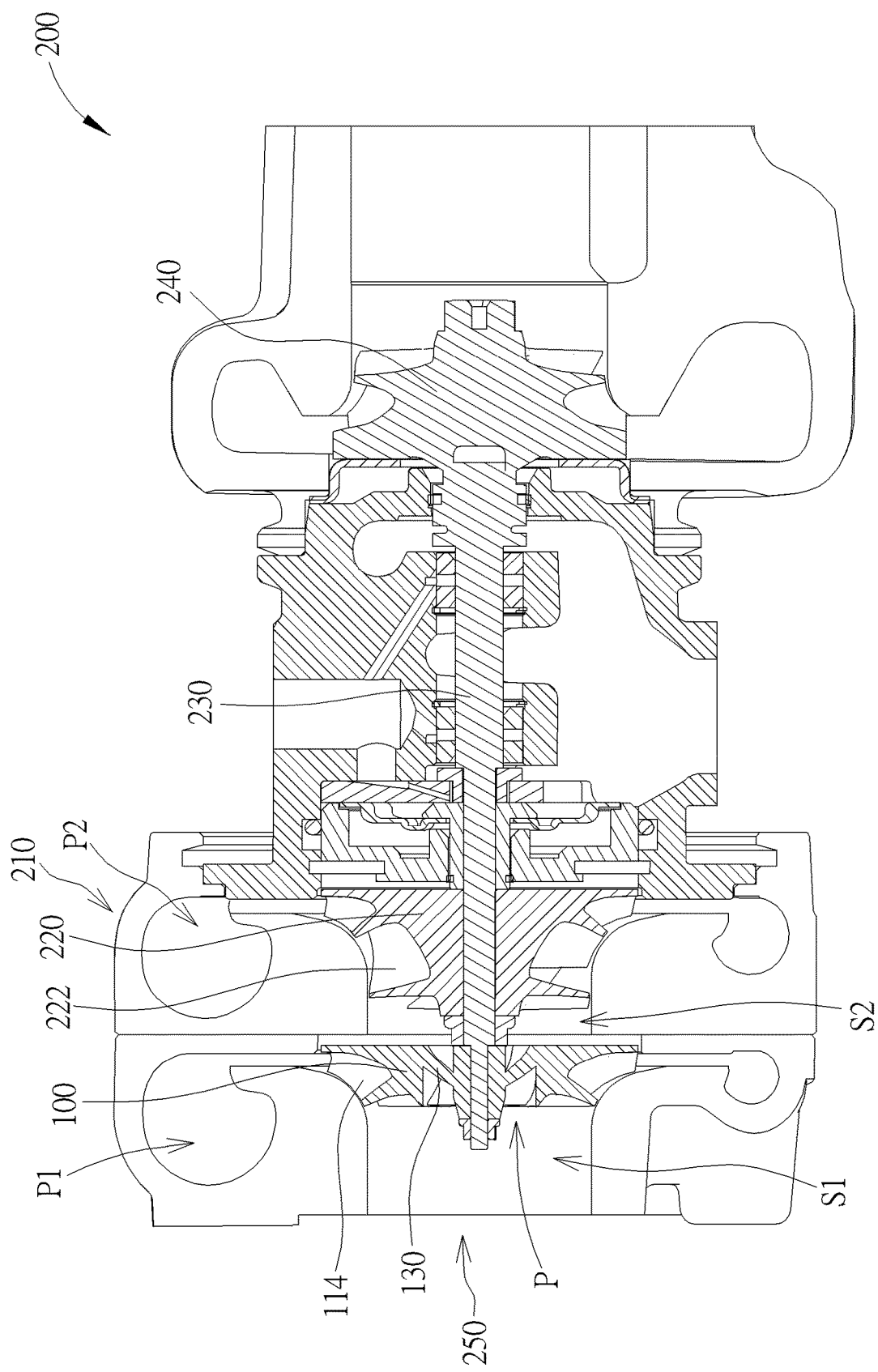
FIG. 4 is a diagram showing a fluid compression device of the present invention.

Please refer to FIG. 4, and refer to FIG. 1 to FIG. 3 as well. FIG. 4 is a diagram showing a fluid compression device of the present invention. As shown in FIG. 4, the compressor wheel 100 of the present invention can be applied to a fluid compression device 200. In the present embodiment, the fluid compression device 200 is a turbo charger, but the present invention is not limited thereto. The fluid compression device 200 comprises a first compressor wheel, and the first compressor wheel comprises a plurality of first blades. It is noted that the first compressor wheel hereinafter is deemed as the compressor wheel 100 which is mentioned in the aforesaid embodiment, and the first blades hereinafter are deemed as the blades 114 which are mentioned in the aforesaid embodiment. In addition to the compressor wheel 100, i.e., the first compressor wheel, the fluid compression device 200 further comprises a housing 210, a second compressor wheel 220, a rotor shaft 230 and a turbine wheel 240. The housing 210 is formed with a first accommodation space S1, a second accommodation space S2, a first passage P1 and a second passage P2. The first passage P1 is arranged at one side of the first accommodation space S1 and communicated with the first accommodation space S1. The second passage P2 is arranged at one side of the second accommodation space S2 and communicated with the second accommodation space S2. The compressor wheel 100 is arranged in the first accommodation space S1. The second compressor wheel 220 is arranged in the second accommodation space S2. The second compressor wheel 220 has a plurality of second blades 222. The rotor shaft 230 is connected to the shaft part 120 of the first compressor wheel (i.e., the compressor wheel 100), the second compressor wheel 220 and the turbine wheel 240. When the turbine wheel 240 is driven to rotate by exhausted air, the turbine wheel 240 can drive the compressor wheel 100 and the second compressor wheel 220 to synchronously rotate through the rotor shaft 230. When the compressor wheel 100 rotates, the plurality of first blades (i.e., the blades 114) of the wheel part 110 is configured to guide air to the lateral side of the compressor wheel 100 from the front side of the compressor wheel 100, in order to drive air in the first accommodation space S1 to flow into the first passage P1. When the second compressor wheel 220 rotates, the plurality of second blades 222 of the second compressor wheel 220 is configured to guide air to a lateral side of the second compressor wheel 220 from a front side of the second compressor wheel 220, in order to drive air in the second accommodation space S2 to flow into the second passage P2. In addition, since the compressor wheel 100 is formed with the fluid passage P, the air can flow to the second accommodation space S2 from the first accommodation space S1 via the fluid passage P. In other words, an air intake 250 of the fluid compression device 200 can simultaneously provide air to the first accommodation space S1 and the second accommodation space S2.

According to the above arrangement, the first compressor wheel (i.e., the compressor wheel 100) and the second compressor wheel 220 of the fluid compression device 200 of the present invention can compress air at the same time. Therefore, flow rate of compressed air of the fluid compression device 200 of the present invention can be significantly increased, in order to further improve compression efficiency of the fluid compression device 200 of the present invention.

On the other hand, each of the connection parts 130 of the compressor wheel 100 can be blade-shaped and configured to guide the fluid to the rear side of the compressor wheel 100 from the front side of the compressor wheel 100 via the fluid passage P when the compressor wheel 100 rotates, in order to increase flow of the fluid flowing to the second accommodation space S2 from the first accommodation space S1 via the fluid passage P. Therefore, the compression efficiency of the fluid compression device 200 of the present invention can be further improved.

In addition, when fluid pressure of the first passage P1 is identical or close to fluid pressure of the second passage P2, the first passage P1 and the second passage P2 can be connected to an intake passage of a same device, such as an intake passage of an internal combustion engine, in order to increase efficiency of the internal combustion engine. When the fluid pressure of the first passage P1 is much different from the fluid pressure of the second passage P2, the first passage P1 and the second passage P2 can be respectively connected to intake passages of different devices, in order to provide compressed fluid to different devices.

In the above embodiment, the fluid compression device 200 of the present invention is not limited to comprising one compressor wheel 100. The fluid compression device 200 of the present invention can comprise a plurality of compressor wheels 100 to allow more compressor wheels 100 to work with the second compressor wheel 220 to compress air, in order to further improve the compression efficiency of the fluid compression device 200 of the present invention.

Moreover, the compressor wheel 100 of the present invention can be applied to other fluid compression device, such as a vacuum cleaner, a hair dryer, etc. In addition, the compressor wheel 100 is not limited to compressing air. The fluid compressed by the compressor wheel 100 can be gas or liquid.

In contrast to the prior art, the compressor wheel of the present invention is formed with the fluid passage to allow the fluid to flow to the rear side of the compressor wheel from the front side of the compressor wheel via the fluid passage. Therefore, when the compressor wheel is applied to the fluid compression device, a plurality of compressor wheels of the fluid compression device can work simultaneously, in order to increase flow rate of compressed air of the fluid compression device. Therefore, the compressor wheel and the fluid compression device of the present invention can improve compression efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A compressor wheel of a fluid compression device, comprising:
   a wheel part, comprising:
      a main body formed with a through hole; and
      a plurality of blades protruded from an outer side of the main body;
   a shaft part accommodated in the through hole, the shaft part being configured to connect to a rotor shaft; and
   a plurality of connection parts connected between an inner side of the main body and the shaft part;
   wherein a fluid passage is formed between the inner side of the main body and the shaft part to allow fluid to flow to a rear side of the compressor wheel from a front side of the compressor wheel via the fluid passage;

wherein each of the connection parts is blade-shaped and is spirally extended from the shaft part to the inner side of the main body, and each of the connection parts is configured to guide the fluid to the rear side of the compressor wheel from the front side of the compressor wheel via the fluid passage when the compressor wheel rotates.

2. The compressor wheel of claim 1, wherein the plurality of connection parts is radially arranged between the inner side of the main body and the shaft part.

3. The compressor wheel of claim 1, wherein the plurality of blades is configured to guide the fluid to a lateral side of the compressor wheel from the front side of the compressor wheel when the compressor wheel rotates.

4. The compressor wheel of claim 1, wherein a rotation axis of the wheel part is identical to a rotation axis of the shaft part.

5. A fluid compression device, comprising:
a housing having a first accommodation space, a second accommodation space, a first passage arranged at one side of the first accommodation space and communicated with the first accommodation space, and a second passage arranged at one side of the second accommodation space and communicated with the second accommodation space;
a first compressor wheel arranged in the first accommodation space, the first compressor wheel comprising:
a wheel part, comprising:
a main body formed with a through hole; and
a plurality of first blades protruded from an outer side of the main body for guiding fluid in the first accommodation space to the first passage;
a shaft part accommodated in the through hole; and
a plurality of connection parts connected between an inner side of the main body and the shaft part, wherein a fluid passage is formed between an inner side of the main body and the shaft part to allow the fluid to flow to the second accommodation space from the first accommodation space via the fluid passage;
a second compressor wheel arranged in the second accommodation space, the second compressor wheel having a plurality of second blades and configured to guide fluid in the second accommodation space to the second passage; and
a rotor shaft connected to the shaft part of the first compressor wheel and the second compressor wheel.

6. The fluid compression device of claim 5, wherein each of the connection parts is blade-shaped and configured to guide the fluid to a rear side of the first compressor wheel from a front side of the first compressor wheel when the first compressor wheel rotates.

7. The fluid compression device of claim 5, wherein the plurality of connection parts is radially arranged between the inner side of the main body and the shaft part.

8. The fluid compression device of claim 5, wherein the plurality of first blades is configured to guide the fluid to a lateral side of the first compressor wheel from the front side of the compressor wheel when the first compressor wheel rotates.

9. The fluid compression device of claim 5, wherein a rotation axis of the wheel part is identical to a rotation axis of the shaft part.

* * * * *